(12) United States Patent
Sgourakes

(10) Patent No.: US 9,207,140 B2
(45) Date of Patent: Dec. 8, 2015

(54) DIFFERENTIAL PRESSURE TRANSMITTER WITH INTRINSIC VERIFICATION

(75) Inventor: George E. Sgourakes, Millis, MA (US)

(73) Assignee: AVGI Engineering, Inc., Mills, MA (US)

( * ) Notice: Subject to any disclaimer, the term of this patent is extended or adjusted under 35 U.S.C. 154(b) by 40 days.

(21) Appl. No.: 13/883,043

(22) PCT Filed: Nov. 3, 2011

(86) PCT No.: PCT/US2011/059114
§ 371 (c)(1),
(2), (4) Date: Dec. 10, 2013

(87) PCT Pub. No.: WO2012/061580
PCT Pub. Date: May 10, 2012

(65) Prior Publication Data
US 2014/0109681 A1   Apr. 24, 2014

Related U.S. Application Data

(60) Provisional application No. 61/409,631, filed on Nov. 3, 2010.

(51) Int. Cl.
| | |
|---|---|
| G01L 9/12 | (2006.01) |
| G01L 13/02 | (2006.01) |
| G01L 15/00 | (2006.01) |
| G01L 19/00 | (2006.01) |
| G01L 19/02 | (2006.01) |
| G01L 9/00 | (2006.01) |

(52) U.S. Cl.
CPC ............... *G01L 13/025* (2013.01); *G01L 15/00* (2013.01); *G01L 19/0015* (2013.01); *G01L 19/02* (2013.01); *G01L 9/0072* (2013.01); *G01L 9/0073* (2013.01)

(58) Field of Classification Search
CPC .... G01L 9/0072; G01L 9/0073; G01L 9/0075
USPC .................. 73/1.57, 718, 717, 716, 715, 700
See application file for complete search history.

(56) References Cited

U.S. PATENT DOCUMENTS

| | | | | |
|---|---|---|---|---|
| 2,925,095 | A | * | 2/1960 | Bates .................. 137/625.43 |
| 4,393,714 | A | * | 7/1983 | Schmidt .................. 73/718 |
| 4,479,070 | A | | 10/1984 | Frische et al. |
| 4,501,051 | A | | 2/1985 | Bell et al. |
| 4,502,335 | A | | 3/1985 | Wamstad et al. |
| 4,572,000 | A | * | 2/1986 | Kooiman .................. 73/718 |
| 4,909,063 | A | * | 3/1990 | Olsen .................. 73/1.57 |
| 2001/0027677 | A1 | * | 10/2001 | Sgourakes .................. 73/1.57 |
| 2001/0032515 | A1 | | 10/2001 | Willcox et al. |
| 2006/0247539 | A1 | | 11/2006 | Schugt et al. |
| 2007/0234814 | A1 | | 10/2007 | Silverbrook et al. |

OTHER PUBLICATIONS

International Search Report, PCT/US2011/059114, mailed May 10, 2012 (2 pages).

* cited by examiner

*Primary Examiner* — Lisa Caputo
*Assistant Examiner* — Nathaniel T Woodward
(74) *Attorney, Agent, or Firm* — Reza Mollaaghababa; Thomas J. Engellenner; Pepper Hamilton LLP

(57) ABSTRACT

The present invention provides a dual sensor differential pressure transmitter with a single fill fluid volume that intrinsically eliminates process and environmental performance influences, increases signal level while substantially reducing product costs.

17 Claims, 8 Drawing Sheets

Cross section 2--2

Cross section 3—3

DIFFERENTIAL PRESSURE TRANSMITTER WITH INTRINSIC VERIFICATION

PRIORITY

The application takes priority from, U.S. Provisional Patent Application Ser. No. 61/409,631, Filed: Nov. 3, 2010, entitled: Differential Calibration Pressure Transmitter With Intrinsic Verification.

FIELD OF THE INVENTION

The invention relate to improved differential pressure transmitters with improved accuracy, their methods of use and manufacture preferably for industrial uses.

BACKGROUND OF THE INVENTION

Differential pressure transmitters require a great deal of care and maintenance in order to function properly for their intended purposes. It is common practice for differential pressure transmitters to be removed from the application or field installation and transported to well-equipped calibration laboratories to assure the accuracy of their measurement. This practice is costly and disruptive. Furthermore, calibration laboratories rarely simultaneously duplicate the combined actual process conditions of a specific transmitter. For example, an inadvertent over-range when re-installing the transmitter on-line will unknowingly compromise "assurance" of accuracy provided by the calibration. Often, a compromised partial calibration is conducted whereupon the output of the transmitter is adjusted for a zero value by a technician at the transmitter.

Unfortunately, measurement accuracy is influenced by the combination of many environmental process and environmental conditions such as process pressure, process temperature, environmental temperature, solar radiation, local neighboring thermal radiation, inadvertent over-range, electronic/mechanical drift and enclosure distortion. Although these influences are interdependent, they are usually considered as being independent. Unfortunately, the user or field technician is not routinely provided with standard techniques or methods to properly compensate for these interdependencies and usually does not have the required facilities.

The present practice is to compensate for these influences without considering their interdependencies. This is pragmatically achieved by erroneously applying independent corrections for the prominent influences. This neglect of the interdependency of the various influences increases errors in measurement. Accurate compensation must be conducted taking into account the actual combined environmental and process conditions.

Conventional differential pressure transmitters having a single sensor exacerbate these detrimental influences. For example, existing single sensor, dual fill fluid volume differential pressure transmitters which tend to have differences in the fill fluid volumes, the spring rates and effective area of pressure sensitive elements of the high and low sides will produce a detrimental differential pressure due to process pressure, process temperature or enclosure distortion acting upon these differences. Similarly, within single sensor, single fill fluid volume differential pressure transmitters having a significant difference in the spring rate of pressure sensitive elements of the high and low sides will produce a detrimental differential pressure due to process pressure, transmitter temperature or enclosure distortion acting upon these differences.

These conditions impact asset management and product quality. A user, until now, has had no recourse other than to accept the poor conditions.

SUMMARY OF THE INVENTION

The many environmental and process influences referred to earlier, are exacerbated by the current differential pressure transmitters employing a single differential pressure sensor. A single sensor differential pressure transmitter cannot compensate for process or environmental influences without determining the pressure and temperature prior to applying the compensation factors. What is proposed therefore is a novel differential pressure transmitter, wherein any compensation for environmental influences does not require monitoring of the pressure and temperature Specifically, the object of the present invention is to provide a dual sensor differential pressure transmitter with a single fill fluid volume that intrinsically eliminates process and environmental performance influences, increases signal level while substantially reducing product costs.

In a first embodiment, the differential pressure transmitter of the invention can provide improved performance at a low product cost. In a second embodiment, the differential pressure transmitter of the invention provides enhancements satisfying more demanding applications. In a third embodiment, the differential pressure transmitter of the invention provides capabilities presently unavailable in the industry and satisfies the most demanding applications. All embodiments comprise a novel system and method for differential pressure-sensing and calibration described herein.

The proposed differential pressure transmitter intrinsically eliminates detrimental process and environmental influences and provides a remotely activated assurance of the elimination of these environmental influences traceable to NIST within +/−0.005% of the reading With the proposed dual sensor, single fill fluid volume differential pressure transmitter, compensation does not require monitoring of the pressure and temperature. The object of the present invention is to provide a dual sensor with a single fill fluid volume differential pressure transmitter that intrinsically eliminates process and environmental performance influences, increases signal level while substantially reducing product costs.

In a first embodiment, the differential pressure transmitter comprises a body, and first and second cavities within said body connecting to a first and a second port, respectively on the exterior of said body. The transmitter further comprises first and second flexible elements assemblies within and sealed to said first and second cavities thereby forming a third and a fourth cavity and a fifth cavity connecting said third and said fourth cavities. The transmitter further comprises a fill fluid having a fluid fill volume within and connecting said third, said fourth and said fifth cavities and means of sensing the first and second position of a first and a second flexible element end within said third and said fourth cavities. The transmitter further comprises means of providing a conditioned response from the said first and said second position of a first and a second flexible element end, wherein, the said conditioned response of said first and said second flexible element end position is proportional to the desired measurement of the said differential pressure applied to said differential pressure transmitter.

In a second further embodiment the differential pressure transmitter of the invention, said aforementioned means of sensing the position of said first and said second flexible element end is achieved by sensing the capacitance between the said first and said second flexible element end and a first and second electrode. In one aspect said first and said second electrode is located within and is electrically insulated and attached to said third and said fourth cavity. In one aspect a first and a second electrical conductor is electrically attached to said first and said second electrode and said first and said second electrical conductor is sealed to contain said fill fluid within said third and said fourth cavities and electrically insulated from said body. An electronic module external to said body and electrically connected to said first and said second conductor and said body can also be provided. The electronic module senses the capacitance between said first and said second flexible element end and said first and said second electrode and provides a conditioned response indicative of the said differential pressure. The change in position of said first and said second flexible element end produces a said first and said second change in capacitance between said first and said second flexible element end and said first and said second electrode and said first and said second change in capacitance is conditioned to provide a response that is proportional to the desired measurement of said differential pressure.

In a third, further embodiment, a change in said fill fluid volume due to temperature variation, process pressure or enclosure distortion volume variation produces equal and opposing influences upon said first and said second flexible element assemblies, and said first and said second flexible element assemblies are produced or compensated to have equal ratios of spring rate to effective areas, thereby causing said temperature variation and said process pressure variation and said enclosure distortion to have minimal influence upon differential pressure measurement As mentioned above, the invention further contemplates an electronic module. In one embodiment, the electronic module comprises means for sensing said first capacitance between said first flexible element end and said first electrode and a said second capacitance between said second flexible element end and said second electrode; means for determining the first and second position of said first and said second flexible element end by sensing said first and said second capacitance; means for determining a reference zero condition position of said first and said second flexible element end while at reference temperature and reference common pressure and no applied said differential pressure; means for determining operating zero condition position of said first and said second flexible element end while at operating temperature and operating common pressure and no applied said differential pressure; means for determining reference differential pressure condition position of said first and said second flexible element end while at reference temperature and reference common pressure and said differential pressure; means for determining operating differential pressure condition position of said first and said second flexible element end while at operating temperature, operating pressure and said differential pressure; a means for determining a first and a second difference in operating position between said operating differential pressure condition position and said operating zero condition position of said first and said second flexible element end; a means for providing an output proportional to said first and a second difference in operating position between said operating differential pressure condition position and said operating zero condition position of said first and said second flexible element end; a means for determining a first and a second difference in reference position between said reference differential pressure condition position and said reference zero condition position of said first and said second flexible element end; and a means for providing an output proportional to the said first and a second difference in reference position between said reference differential pressure position and said reference zero position of said first and said second flexible element end.

In another embodiment, the electronic module of the invention comprises means for determining said fill fluid temperature; means for determining said fill fluid pressure; means for calculating the change in said operating differential pressure condition from reference zero condition due to a change in said fill fluid temperature; means for calculating the change in said operating differential pressure condition from said reference zero condition due to a change in said fill fluid pressure; means for providing an output of said temperature; means for providing an output of said pressure; and means for providing an output of said reference zero condition thereby determining a reference zero condition.

The differential pressure transmitter of the invention may optionally further comprise a three-position valve. In one embodiment the three position valve comprises: a valve body having a first external port and a second external port to external pressures and said body having two internal transmitter ports a first internal port and a second internal port connecting to said differential pressure transmitter; a rotary valve plug having two internal flow conduits; and means of positioning said rotary valve plug to any of three-positions. In one aspect, the three positions of the valve are as follows: a first position wherein the first external port is connected to the first internal port and the second external port is connected to the second internal port; a second position wherein the first internal port is connected to the second internal port and no connection made between the first and second external ports external ports; and a third position wherein the first external port is connected to the second internal port and the second external port is connected to the first internal port. In this aspect, normal operation of said differential pressure transmitter is configured per said first position, process isolation and said differential pressure transmitter equalization is configured per said second position and reverse operation of said differential pressure transmitter is configured per said third and wherein prior to entering said first or third positions said three-position valve enters said second position In another aspect, the aforementioned three position valve may further comprise means of determining said reference zero position by isolation of said differential pressure transmitter from said process while maintaining process pressure upon said differential pressure transmitter and equalization of the said differential pressure upon said differential pressure transmitter in said second position said three position valve and whereby, without any said differential pressure or with constant said differential pressure, the said differential pressure transmitter output in said normal operation is compared to the said differential pressure transmitter output in said reverse operation and provides an indication of the differences in density and/or liquid height of process fluid in the impulse lines connected to said differential pressure transmitter and thereby provides a means for the compensation of impulse line density and level influences.

In one aspect the abovementioned electronic module implements a method for compensating the combined influence of said temperature and said pressure due to said change in said fill fluid fill volume, said spring rates and said effective areas of said first and said second flexible element assemblies. In one embodiment the method comprises isolating said differential pressure transmitter from said process while maintaining said process pressure and said temperature within said differential pressure transmitter and allowing equalization of said high side and said low side; sensing said process pressure with a process pressure sensor; sensing said temperature with a process temperature sensor; sensing said operating zero condition of said first and said second flexible element at said process pressure and said temperature; calculating the deflection of said first and second flexible element due to said process pressure; calculating the deflection of said first and second flexible elements due to said process temperature; alculating the ratio of said spring rate to said effective area of said first and second flexible elements; calculating the said spring rates of said first and second flexible elements; calculating the said areas of said first and second said flexible elements; and generating and applying compensation factors for said first and said second flexible elements for said process pressure and said temperature. The aforementioned method compensating for the said differential pressure transmitter for influences of the combined influence of said temperature and said pressure due to said change in said fill fluid fill volume, said effective areas and said spring rates of said first and said second flexible element assemblies.

In another embodiment the differential pressure transmitter of the invention may optionally comprising a three position actuator. In one embodiment the three-position actuator comprises a first cylinder having a first piston and a first pressure port, the first cylinder having a stop for limiting axial motion of said first piston; and a second cylinder having a second piston, said second cylinder having an axial slot and said second piston having a radial extension positioned within said axial slot of said second cylinder; and a third cylinder having a third piston and a second pressure port the third cylinder further comprising a stop for limiting axial motion of said third piston. A first actuator position is obtained by pressure being applied to said first cylinder through said first port, a second actuator position is obtained by pressure being applied to said third cylinder through said second port and a third position is obtained by pressure applied to said first cylinder through said first port and to third cylinder though said second port. Positioning of said center piston moves said three-position valve to said position one, said position two or said position three and said radial extension of said second piston provides a means of moving an external device to any of the said three positions.

In another embodiment, the transmitter may optionally include a gravitational pressure reference source. In one aspect, the gravitational pressure reference source comprises: a body; an internal cavity having a post; a sphere having a hole containing termination of said post that is attached to said sphere is sealed to said post; a cylinder having enlarged internal diameters at each end; a stepped cylindrical post attached to said cylinder; a cylindrical weight with an internal diameter accepting said stepped cylindrical post; and a means of securing said stepped cylindrical post to said cylindrical weight, wherein said cylinder, said stepped cylindrical post and said cylindrical weight comprise a gravitational reference assembly. The gravitational pressure reference source further comprises an internal cylindrical magnet within a cavity in said body and vertically below and concentric with said gravitational reference assembly wherein the said internal cylindrical magnet can be raised by an external magnet field with opposing magnetic poling and said raising of said internal magnet raises said gravitational reference assembly relative to said sphere and wherein upon a change of said external magnet field the said internal cylindrical magnet falls rapidly due to gravity and the said change in said external magnet field and wherein the gravitational reference assembly falls under the action of gravity producing a reference pressure in the said cavity of the said cylinder and wherein said reference pressure is applied to the internal cavity of the post. The gravitational pressure reference source may also include a means of measuring temperature by capturing the time of the descent for a known distance of the said gravitational reference assembly and a means for converting the said time of a descent for a said known distance to an average velocity of the said fill fluid through said gravitational reference assembly and from said average velocity through said gravitational reference assembly determine a viscosity of said fill fluid and from said viscosity determine said temperature from known viscosity versus temperature relationships. The response of the differential pressure transmitter upon the application of the gravity pressure reference provides a means of sensing said reference pressure for verifying calibration and determining said temperature of said fill fluid.

The differential pressure transmitter may also further comprise an actuator for actuating said gravitational pressure reference. In one embodiment the gravitational pressure reference actuator comprises: (a) a piston having a longitudinal axis, said piston having four cavities with an axis of symmetry perpendicular to and intersecting said longitudinal axis of said piston and said axis of symmetry of said four cavities and said longitudinal axis are parallel and said piston having four magnets contained within the said cavities and the magnetic poling of each said magnet alternates along said piston longitudinal axis; and (b) a cylinder with a first and a second closed end wherein said piston and said magnets are contained within said cylinder and said piston and said cylinder having means for preventing rotation of said piston within said cylinder. The cylinder has a first and a second pneumatic port located at a first and second closed end of said cylinder respectively. By applying pneumatic pressure to the first pneumatic port the piston is moved to the second closed end. Likewise by applying pneumatic pressure to the second pneumatic port the piston is moved to the first closed end of the cylinder.

In one aspect, the magnets of the aforementioned gravitational pressure reference actuator within said process enclosure are raised by external magnets by providing an axial opposing magnetic field. Likewise, said magnets within a said process enclosure are lowered by said external magnets by providing an axial additive magnetic field and wherein means is provided for actuating said gravitational pressure reference.

In one embodiment the flexible element assemblies of the differential pressure transmitter of the invention may comprise one or more axial thin cylindrical sections having, at each said axial end, a thin radial extension and wherein said thin radial extensions of successive said axial thin cylindrical sections are joined at the outermost radial position and wherein one of said axial thin cylindrical sections having said thin radial sections at said axial end is joined to a support member and opposing said axial thin cylindrical section of the said one or more axial thin cylindrical sections having said thin radial section at axial end is joined to an end member and said radial sections are normally distended in the said axial direction. Upon application of a high value of said external process pressure the said thin radial sections deflect axially until restrained by said support member and by mating of said radial sections and said flexible element ends are capable of returning to original condition after enduring said external process pressure due to the low stress encountered In one aspect of the invention the transmitter of the invention calculates a correction factor as follows. An external, equal and common pressure is applied to the said first and second flexible element assemblies The deflection of each of said flexible element assemblies as a result of the said compression of said fill fluid due to said pressure is sensed. The difference in the ratio of spring rate to effective area of a said first and second flexible element assemblies is determined by comparing the said displacements of the said pair of flexible element ends in response to the said common pressure. A correction factor consisting of the ratio of spring rate to effective areas of said first and second flexible element assemblies is produced and is used to compensate for said deflections of said first and second flexible element assemblies in the sensing of said differential pressures.

In addition to process and environmental influences, over-range of the differential pressure transmitter is a major influence and usually not specified or considered. If specified, it usually does not apply to worst-case conditions resulting from a combination of maximum working pressure while at maximum process temperature. The proposed differential pressure-sensing concept minimizes these over-range concerns due to hysteresis from over stressing by an assurance that the proposed concept is not highly stressed and well supported during the over-range. Zero and span return errors from overstressing as in present practice are significantly minimized. Thus an improvement in over-range performance is inherent in the proposed differential pressure-sensing concept and resolves the worst-case condition of maximum process pressure over-range at maximum process temperature.

The proposed dual sensor, single fill fluid volume differential pressure transmitter is shown in FIG. 1 and the dual sensor concept is shown in cross-section in FIG. 2. This proposed dual sensor concept does not eliminate the undesirable change in fill fluid volume occurring with changes in pressure, temperature or enclosure distortion but it does intrinsically eliminate the undesirable error influence. Any differential pressure developed due to the change in fill fluid volume for whatever cause is applied equally and opposingly to the high and the low side flexible element assemblies with no differential pressure being sensed by the differential pressure transmitter. Ideally, if the combined response of spring rates and effective areas of the high and low side flexible element assemblies are matched, there cannot be a differential pressure developed in the proposed concept due to the detrimental influences.

Optimization of the proposed concept requires design and manufacturing considerations to assure this match of the combined response of spring rates and effective areas of the high and low side flexible element assemblies of (3A) and (3B) of FIG. 2. Although these efforts may produce a good match, it cannot be assured to be insignificant. However, an innovative simple manufacturing procedure assures these differences in the spring rates and effective areas of the high and low side flexible element assemblies due to manufacturing tolerances are insignificant. During the manufacturing process, a high pressure is simultaneously applied to the high and low side flexible element assemblies while monitoring the deflections of the high and low side flexible element ends resulting from the compression of the fill fluid. The difference in the deflection of the flexible element ends provides a means of compensating for the difference in the effective areas and spring rates of the flexible element assemblies. The equation for compensation will be developed further in the discussion and illustrates how the compensation is implemented. Thusly, the difference in the spring rates and effective areas of the flexible element assemblies due to manufacturing tolerances is minimized and ideally eliminated assuring a high level of performance. Furthermore, this process can also be applied in the field. Thus, a user can verify high performance upon receipt and during routine maintenance.

The proposed dual sensor, single fill fluid volume differential pressure transmitter is simple in construction. A single fill fluid chamber exists between the high side flexible element assembly and low side flexible element assembly. Within this single chamber, there are fixed electrodes (4a) and (4b) of FIG. 2 that are in close proximity to each of the flexible element ends (8A) and (8B). The sensing is achieved by simultaneously measuring the differential change in capacitance due to the deflection of the flexible element end with respect to the fixed electrode for the high and the low side. A pressure applied to the high side deflects the flexible element end of the high side inwardly towards the fixed electrode and simultaneously the fill fluid causes the low side flexible element end to deflect outwardly away from the fixed electrode due to the equal displaced volume of the flexible elements assemblies.

Operation of the differential pressure transmitter in a flow or level application, is categorized by four conditions that may be defined:

1. When the transmitter is assured to be at a reference temperature, reference process pressure and no differential pressure, the output is defined as "reference zero condition".

2. When the transmitter is assured to be at a known temperature, known process pressure and no differential the output is defined as "operating zero condition".

3. When the transmitter is assured to be at a known temperature, known process pressure and a known differential pressure with respect to "reference zero condition" is defined as "reference differential pressure condition".

4. When the transmitter is assured to be at a known temperature, known process pressure and at a differential pressure being measured, it is defined as "operating differential pressure condition".

The proposed advanced and premium differential pressure transmitter concepts will satisfy the requirements of more demanding applications. The advanced and premium differential pressure transmitters are composed of the standard differential pressure transmitter with ancillary devices.

There are three ancillary devices:

The advanced and premium product has an actuator that remotely operates a three-position valve for normal, equilibrate or reverse position. The equilibrate position isolates the transmitter from the process.

The premium product also incorporates a gravitational pressure reference that verifies calibration traceable to National Institute of Standards with an actuation device that provides remote operation of the gravitational pressure reference.

The proposed premium dual sensor, single fill fluid volume differential pressure transmitter concept provides capabilities that presently are not available in the industry and will now be described.

Differential pressure transmitters have been improved in recent years. An example is provided in U.S. Pat. No. 6,321,585 Sgourakes for a Differential Pressure Generator. This improvement eliminates all detrimental combined interdependent process and environmental influences of differential pressure transmitters by remotely verifying measurement accuracy within +/−0.005% of reading traceable to National Institute of Standards while transmitter is on-line at process and environmental operating conditions for flow and liquid level applications.

The present invention integrates U.S. Pat. No. 6,321,585 Sgourakes Differential Pressure Generator within the proposed premium differential pressure transmitter and with the addition of proposed ancillary devices, provides an exceptional high-performance premium differential pressure transmitter for flow and liquid level applications with remote calibration assurance.

The premium differential pressure transmitter provides significant advancements in performance. Some of the advancements enhancing the remote calibration verification of U.S. Pat. No. 6,321,585 Sgourakes for a Differential Pressure Generator are:

1. A reference zero condition value is available with each differential pressure observation providing an ability to monitor zero conditions during normal differential pressure measurement.
2. Detrimental influences of environmental temperature, process temperature and process pressure are intrinsically eliminated from the differential pressure transmitter.
3. Automatically scheduled sensor calibrations can be achieved remotely during routine sustained operation.
4. Reverse flow capability. The three-position valve provides an ability to measure normal or reverse flows.
5. Elimination of density or level differences in impulse lines is assured. This is achieved by comparing the zero condition in normal and reverse positions of the three-position valve. Any difference can be attributed to density or level differences in the impulse lines and the influence compensated.
6. The transmitter provides greater range limits by providing lower span capability avoiding the cost and complexity of multiple transmitters with intermediate spans.
7. Minimal over-range influence.
8. A very low cost of manufacture.
9. Calibration is assured to be within +/−0.005% of reading traceable to National Standards Institute, achieved from remote locations without a technician present at transmitter, at actual combined operating conditions, on-line and without flow interrupt.
10. Pro-active maintenance can respond if a trend of concern develops from sequential calibration assurances or from monitoring of the zero value at each differential pressure acquisition.
11. Instantaneous assurance of proper operation can be remotely verified within minutes during crisis conditions.
12. Eliminates the need to interrupt signal, remove transmitter from process line, hand written manual calibration history management, lengthy evaluations in a calibration laboratory requiring the simulation of process pressures and environmental temperatures.
13. Provides a capability for remotely scheduled customer/buyer audits eliminating skilled operators, costly travel, hotel accommodations and seasoned resources.
14. The present capacitive single sensor concepts are typically a stretched diaphragm with an effective area of approximately ⅓ inch squared with non-linear deflection. Conversely, the proposed capacitive concept has an effective area of 3.5 inches squared with linear deflection. Thus providing a factor of ten improved sensitivity.

BRIEF DESCRIPTION OF THE DRAWINGS

FIG. 6A is a cross sectional view of the three position valve in the equilibrate position with center piston positioned in center position.

DETAILED DESCRIPTION OF THE INVENTION

Figure 1:
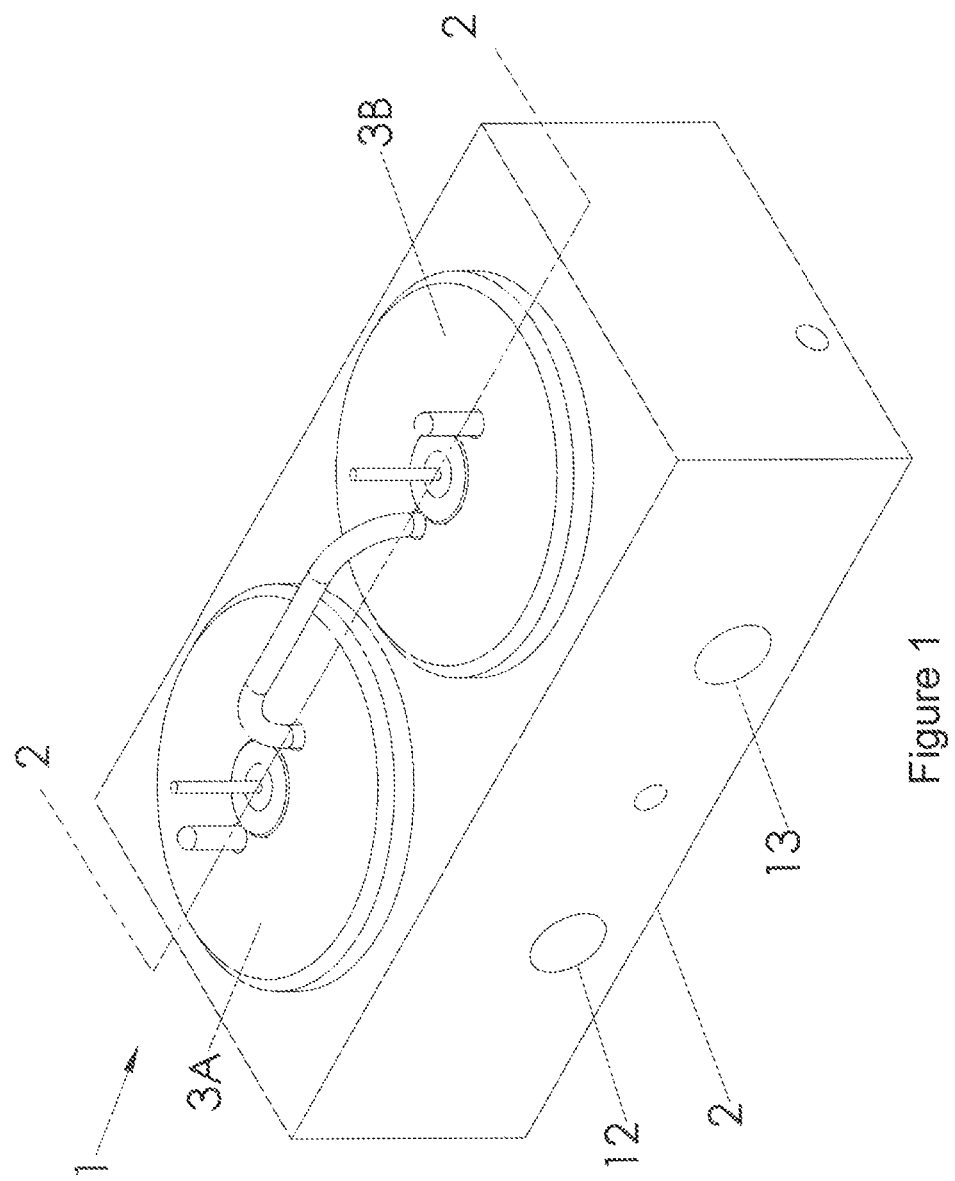
FIG. 1 is an isometric view of the differential pressure transmitter.

The proposed dual sensor, single fill fluid volume differential pressure transmitter (1) is illustrated in FIG. 1 with the major components shown as a body (2), two process interface assemblies (3A) and (3B), high pressure process port (12) and low pressure process port (13).

Figure 2:
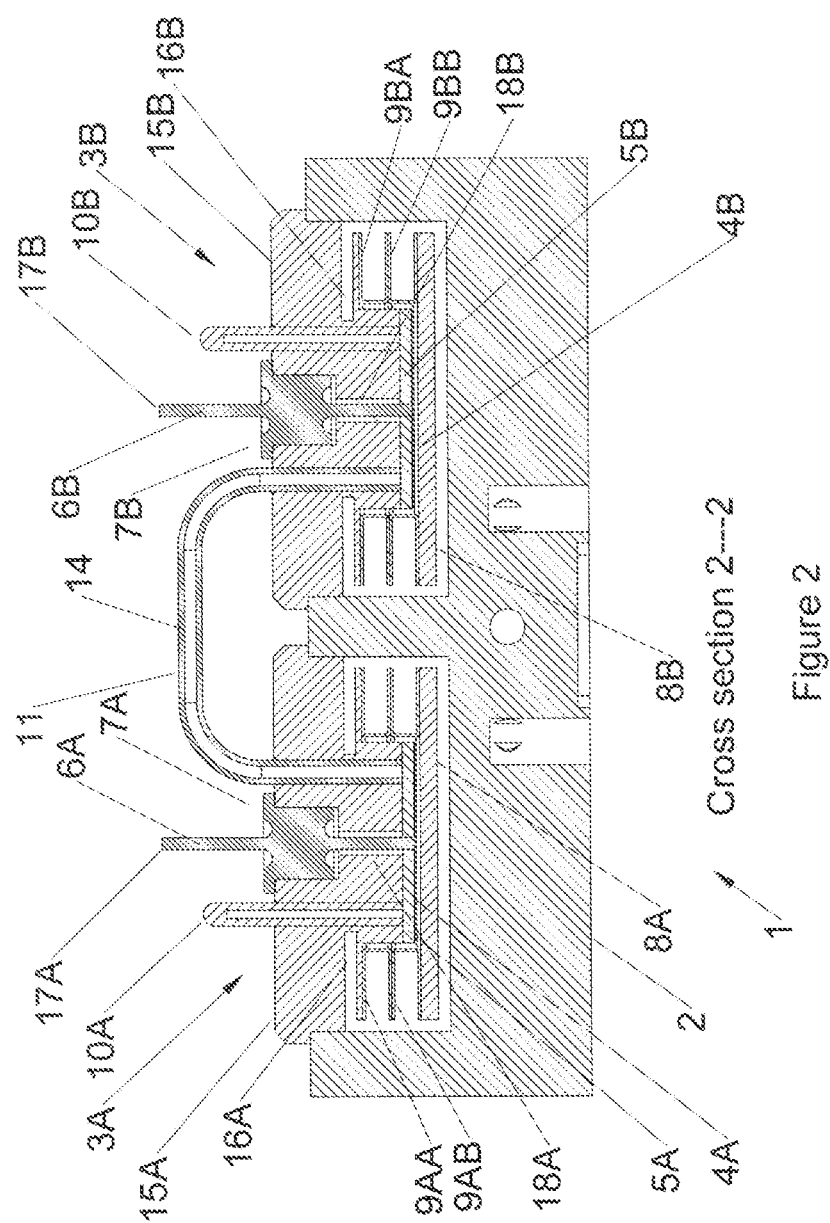
FIG. 2 is a cross sectional view of the proposed differential pressure sensor of the differential pressure transmitter.

The dual sensor, single fill fluid volume differential pressure transmitter (1) of FIG. 1. is very compact and optimized to accommodate present impulse line spacing of 2⅛" between high-pressure process port (12) and low-pressure process port (13). The flexible element assembly (3A) of FIG. 2, is composed of a flexible element end (8A) and two convolutions (9AA) and (9AB). The flexible element assembly (3A) is attached to a base (15A) having an isolation groove (16A) that minimizes influences from distortion of the body (2) due to process pressure or process/environmental temperature. Additional components are the fill fluid (14), fill fluid connecting tube (11) and fill fluid filling ports (10A) and (10B).

The dual sensor measures the differential pressure by sensing the capacitance change due to the deflection of flexible element end (8A) with respect to the fixed electrode (4A) as shown in cross section 2—2 of FIG. 2. and simultaneously the deflection of flexible element end (8B) with respect to the fixed electrode (4B). The flexible element assemblies (3A) and (3B) thereby provide process isolation and a differential pressure sensing capability.

The flexible element assembly (3A) has an electrode (4A) mounted upon an insulator (5A) that is attached to the base (15A). The electrode (4A) has an electrical conductor (6A) providing electrical continuity from the electrode (4A) to an electrical termination (17A) of hermetic seal (7A). The electrical conductor (6A) has a stress relief (not shown) that minimizes thermal expansion and pressure expansion influences to assure reliable connectivity between electrode (4A) and the electrical termination (17A) of the hermetic seal (7A). Additionally, the electrical conductor (6A) is contained within an insulator (18A) to minimize undesirable capacitive coupling and restrict relative motion between the conductor (6A) and the body (2).

A fill fluid (14) hydraulically couples the flexible element assembly (3A) of the high side to the flexible element assembly (3B) of the low side. Thus a high pressure applied to a flexible element assembly (3A) of the high side causes an inward deflection while the opposing flexible element assembly (3B) experiences an outward deflection.

The equations predicting the differential pressure considering the position of the flexible element ends (8A) and (8B) and the ratio of spring rate to effective area of the flexible elements (9AA), (9AB), (9BA), and (9BB) of FIG. 2. are developed as follows:

Definitions:
PHS=Pressure sensed on high side
PI=Internal pressure of fill fluid
P=Process pressure on high and low side
KH=Spring rate flexible element assembly high side
KL=Spring rate flexible element assembly low side
AH=Effective area flexible element assembly high side
AL=Effective area flexible element assembly low side
DHR=Position of high side flexible element end with PHS
DHZ=Position of high side flexible element end without differential pressure
DLR=Position of low side flexible element end with PHS applied to high side
DLZ=Position of low side flexible element end with no differential pressure The summation of the forces applied to flexible element ends are determined as follows:

$$AH*(PHS+P-PI)-KH*(DHR-DHZ)=0 \text{ Sum of forces on high side flexible element}$$

$$PHS + P - PI = \frac{KH*(DHR-DHZ)}{AH}$$

d/p of high side flexible element $$AL*(PI-P)-KL*(DLR-DLZ)=0 \text{ Sum of forces on low side flexible element}$$

$$PI - P = \frac{KL*(DLR-DLZ)}{AL}$$

d/p of low side flexible element $$PHS = \frac{KH}{AH}*(DHR-DHZ) + \frac{KL}{AL}(DLR-DLZ)$$

Desired equation for differential pressure

Thus the sum of the deflections of the flexible element ends is proportional to the differential pressure.

This equation requires the actual value of each ratio of spring rate to effective areas of the flexible element assemblies be known. Alternatively, an innovative procedure has been developed. In this procedure, a high process pressure is applied to the high process pressure port (12) and simultaneously to the low process pressure port (13) thereby compressing the fill fluid volume (14). The compression of the fill fluid is sensed by the deflection of each flexible element end. The ratio of these deflections provides a means of compensating the ratios of spring rate to effective area of the two flexible element assemblies. The compensation is developed as follows:

Definitions:
PI=Process pressure internal
P=Process pressure high and low side
DLP=Position of low side DHP=Position of high side
T=Temperature difference from a reference temperature
a=Coefficient of thermal change in volume
b=Bulk Modulus Coefficient of pressure change to volume change A force balance summation of each flexible element assembly provides the desired relation to be used in the compensation.

$$(P-PI)*AH - KH*DHP = 0$$

$$(P-PI)*AL - KL*DLP = 0$$

$$P - PI = \frac{KH*DHP}{AH}$$

$$P - PI = \frac{KL*DLP}{AL}$$

$$DHP = \frac{DLP}{\frac{KH*AL}{AH*KL}}$$

Equating pressures and solving for desired ratio $$K = \frac{KH*AL}{AH*KL}$$

$$DHP = \frac{DLP}{K}$$

Abbreviate

The ratios of spring rate to effective area of the two flexible element assemblies can now be compensated using this factor. Compensation is achieved by arbitrarily selecting the high side flexible element assembly as a reference and applying the compensation factor to the low side flexible element assembly. Thus the compensated equation becomes:

$$PHS = \frac{KH}{AH}*(DHR-DHZ) + \frac{KH}{AH}*\frac{DLR-DLZ}{K}$$

The compensation also requires a change in reference from KL/AL to KH/AH for the low side.

Thusly, the desired differential pressure can be sensed from the deflection of the compensated flexible element assemblies without a need to determine the actual value of the spring rate or effective area of each flexible element assembly. An overall calibration coefficient would include the ratio of spring rate to effective and an additional factor for setting the output for a given input.

It will now be shown how the compensated equation intrinsically eliminates the detrimental influences of process and environmental influences. A change in the common fill fluid volume will cause an equal and opposing change in the differential pressure applied upon each of the flexible element assemblies but will not cause any change in the total differential pressure sensing. This is an important and basic benefit, for process temperature, process pressure, environmental temperature and enclosure distortion will change the common fill fluid volume. Therefore the detrimental performance influences are intrinsically eliminated.

An equation considering the detrimental influences will illustrate the manner in which they are intrinsically eliminated. The deflection associated with the detrimental differential pressure due to an increased process pressure compressing the fill fluid volume can be determined from the following equations:

$$DPH = \frac{P * \beta * V}{2 * AH}$$

$$DPL = \frac{P * \beta * V}{2 * AL} * \frac{AL}{AH}$$

$$DPH = DPL$$

Similarly, The deflection associated with the detrimental differential pressure due to due to an increased temperature expanding the fill fluid volume can be determined from the following equations:

$$DTH = \frac{T * \alpha * V}{2 * AH}$$

$$DTL = \frac{T * \alpha * V}{2 * AL} * \frac{AL}{AH}$$

$$DTL = DTH$$

Including these influences within the basic equation provides:

$$PHS = \frac{KH}{AH} * (DHR - DHZ) + DPH - DTH + \frac{KH}{AH} * \frac{DLR - DLZ}{K} - DPL + DTL$$

This complete, compensated equation reveals that the detrimental influences are equal and opposing and are therefore intrinsically eliminated. The need to continually sense the process pressure and process temperature and apply an instantaneous compensation is eliminated.

AH and AL can be verified with the three-position valve in the equilibrate position. With the addition of a temperature and pressure sensors, an awareness of the thermal coefficient of volumetric change and the bulk modulus of the fill fluid, the fill fluid volume and the sensed total deflection DTPH and DTPL provides a means to determine AH and AL.

$$DTPH = DTH + DPH \text{ and } DTPL = DTL + DPL$$

$$DTH = \frac{T * \alpha * V}{2 * AH} \quad DPH = \frac{P * \beta * V}{2 * AH}$$

$$AH = \frac{V}{2 * DTPH} * (T * \alpha * P * \beta)$$

Similarly:

$$AL = \frac{V}{2 * DTPL} * (T * \alpha + P * \beta)$$

Ancillary Devices

Figure 3:
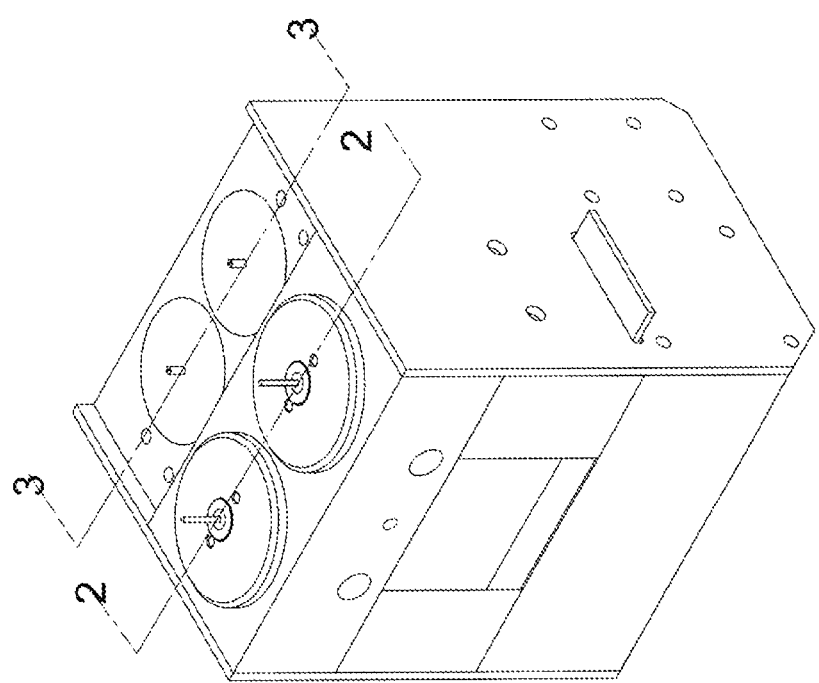
FIG. 3 is an isometric view of the premium differential pressure transmitter with integrated three-position valve and valve operator and gravitational reference with operator.

The ancillary devices providing the desired enhancements of the differential pressure transmitter (1) are the three-position valve, valve actuator, gravity pressure reference and the gravity reference actuator. All ancillary devices are contained within an assembly (14) of FIG. 3. They will be described sequentially in the following description.

Figure 4:
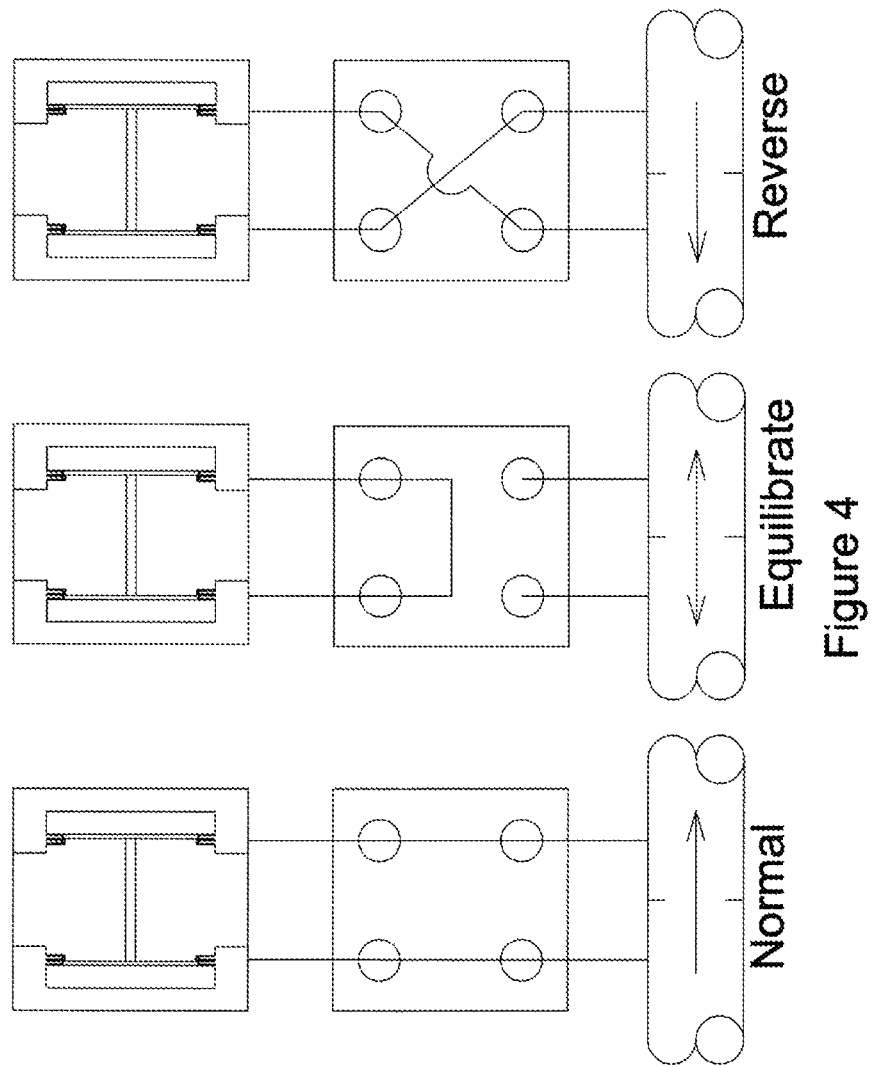
FIG. 4 is a schematic view illustrating the three position hydraulic connections.
Figure 5:
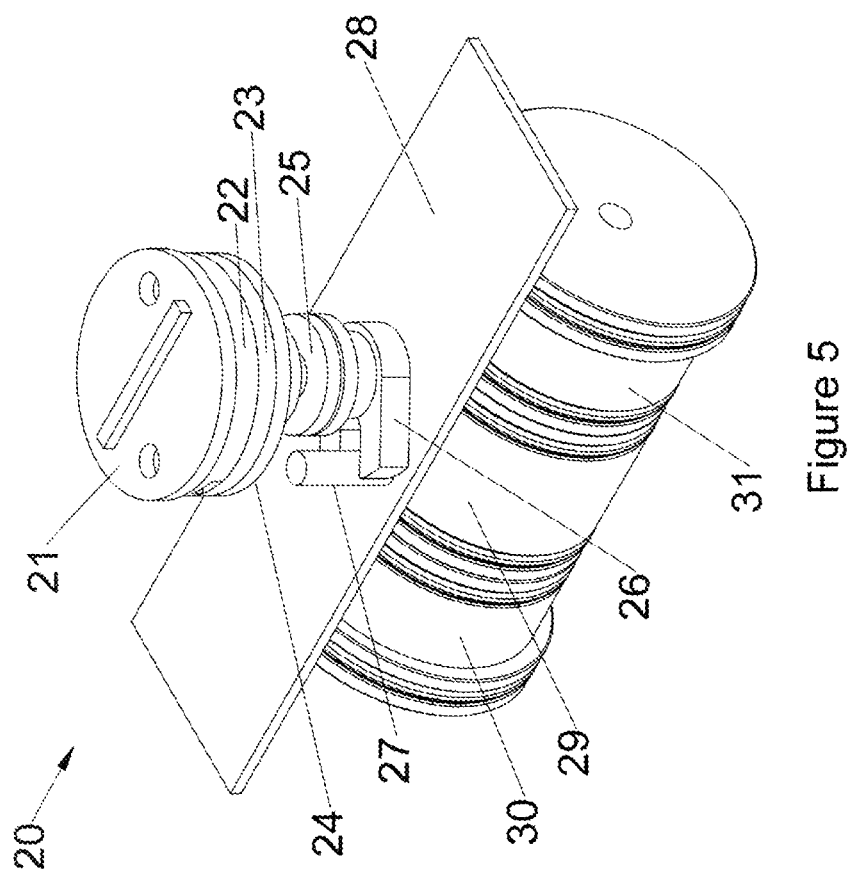
FIG. 5 is a view showing the three-position valve components in the normal position.

The three-position valve configures the proposed differential pressure transmitter (1) for normal, equilibrated or reverse operation and are shown schematically in FIG. 4. The main components of the proposed three-position valve and valve operator (20) are shown in FIG. 5 and now considered.

The normal position of FIG. 4. connects a high-pressure process port to a high-pressure differential pressure transmitter port and a low-pressure port to a high-pressure differential pressure transmitter with a normal flow direction.

Equilibrate position of FIG. 4. connects a high-pressure differential pressure transmitter port to a low-pressure differential pressure transmitter port equilibrating pressures and no differential pressure being applied to the differential pressure transmitter.

Reverse position of FIG. 4. connects a high-pressure process port to a high-pressure differential pressure transmitter port and a low-pressure process port to a low-pressure differential pressure transmitter port providing reverse flow measurement capability. Although the differential pressure transmitter (1) remains in the same position, the high-pressure and low-pressure ports of the reverse position of the differential pressure transmitter (1) are opposite the high-pressure and low-pressure ports of the normal position.

The three position valve and operator (20) as shown in FIG. 5 is composed of a fixed valve seat (21) that is restricted from rotation by a matching keyway in the body (2) that is not shown and provides the ports for communication with the differential pressure transmitter (1), a selector disc (22) that is rotated to configure the desired positions of FIG. 4, a compensation plate that is not shown, provides axial compensation for thermal and pressure deflections and torsionally couples selector disc (22) to rotor (24), an axial spring (23) that provides a load to selector disc (22) and rotor (24) assuring that selector disc (22) achieves a seal with valve seat (21) while compensating for thermal and pressure deflections, rotor (24) is driven by a crank (26) of three position actuator.

Figure 6:
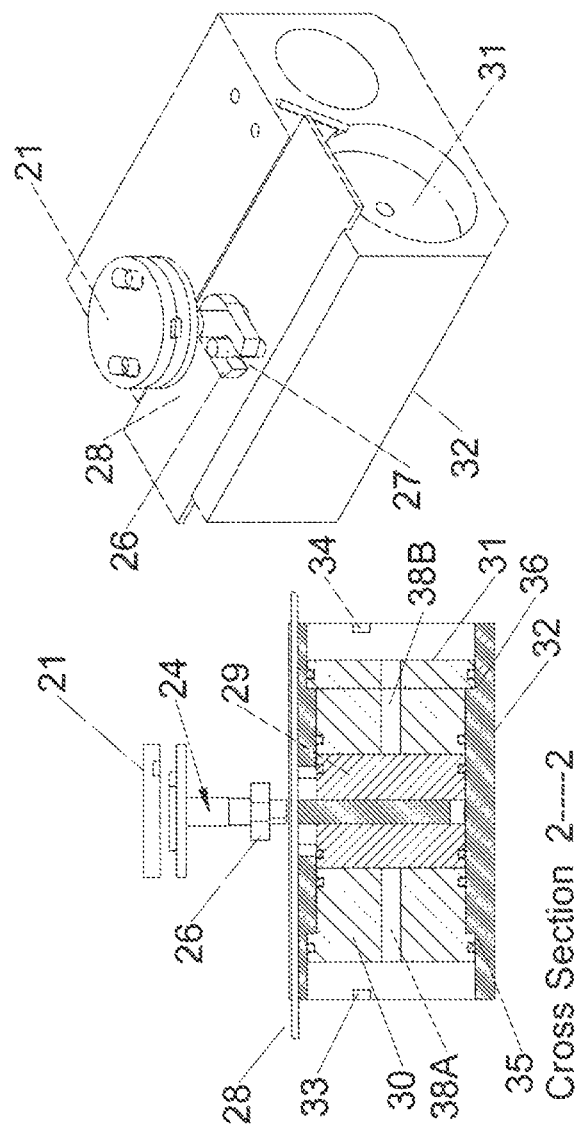
FIG. 6 is an isometric view of the three position valve components in the equilibrate position.

The novel three-position actuator of the three-position valve (20) is shown in cross section 2-2 of FIG. 6A) for the equilibrate position. The center piston (29) is driven to the equilibrate position by applying pressure to port (33) that acts upon piston (30) forcing it to the right until arrested by stop (35) in cylinder of lower molding (32) and simultaneously applying pressure to port (34) that acts upon piston (31) forcing it to the left until arrested by stop (36) in the cylinder of lower molding (32).

The normal and reverse positions of the valve actuator are achieved by motion of three pistons (30), (31) and (32) having an innovative sequence. Referring to FIG. 6A, when the pneumatic port (33) on the left is pressurized, the left piston (30) travels to the right and engages the center piston (29) and sequentially engages the right piston (31) and continues to the right until piston (30) is limited by a stop (35) at this time the pressure is applied to center piston (29) through path (38A) and piston (31) is then driven to the right termination of the cylinder. Similarly, when the pneumatic port (34) on the right is pressurized, the right piston (31) travels to the left and engages the center piston (29) and sequentially engages the left piston (30) and continues to the left until piston (31) is limited by a stop (36) at this time the pressure is applied to center piston (29) through path (38B) and piston (30) is then driven to the left termination of the cylinder.

Motion of piston (29) of FIG. 6A actuates the valve. A post (37) of the center piston (29) is attached to valve plate (28) and valve plate (28) is coupled to a crank (26). As post (37) is positioned to the left, center and the right, it rotates the crank (30) of the three-position valve (20). The crank (26) turns the rotor (24) that positions the selector disk (22) to the desired valve position. The valve may also be operated manually by positioning valve plate (28) by hand. Valve plate (28) provides an indication of the position of the valve.

The three-position valve (20) provides the ability to determine and remove the influence of level or density in impulse lines. With a constant flow or ideally no flow, the three position valve (20) is first positioned in the normal position and the normal value of the differential pressure transmitter (1) is determined. Then the three-position valve (20) is positioned in the reverse position and the reverse value of the differential pressure transmitter (1) is determined. The results are compared and a correction made to minimize any level or density differences in the impulse lines.

Figure 7:
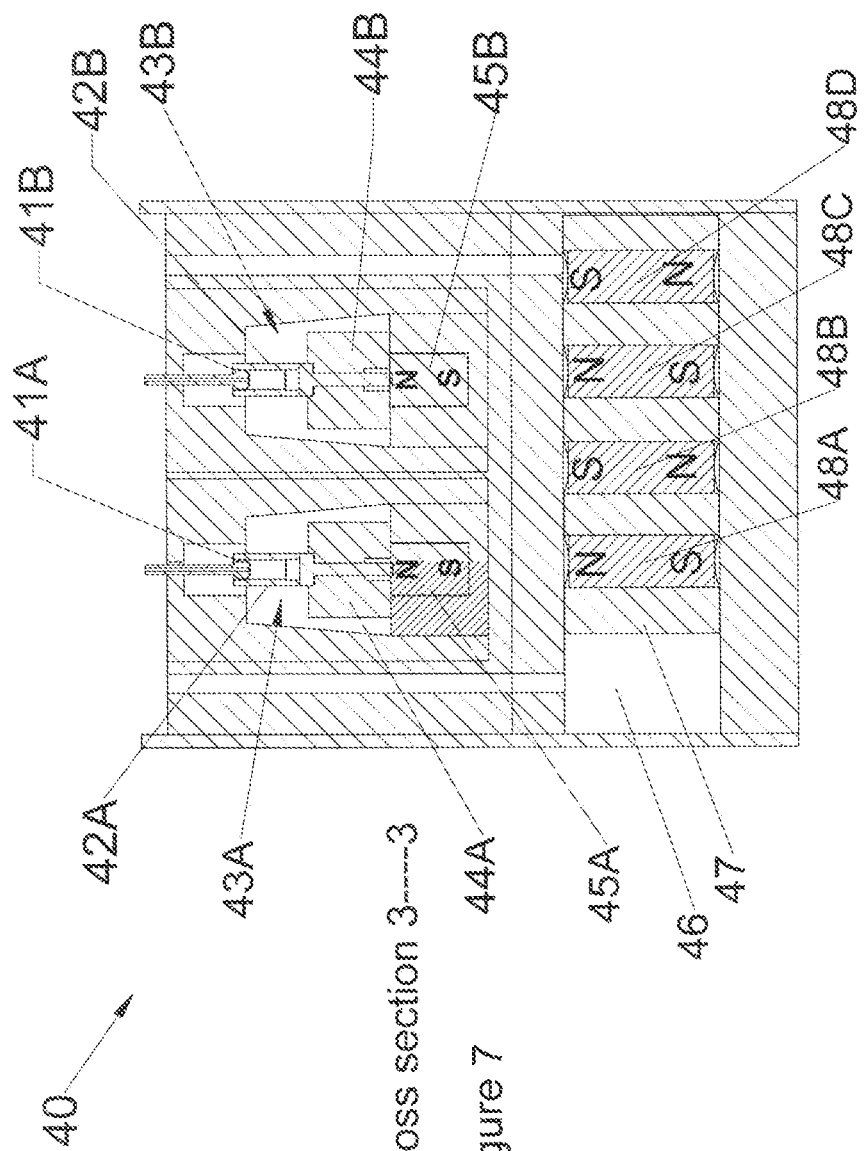
FIG. 7 is a cross sectional view of the gravitational pressure reference with the actuator in the normal run position.

The gravity pressure reference (40) shown in cross section 3—3 of FIG. 7, functions is described in detail in U.S. Pat. No. 6,321,585 Sgourakes for a Differential Pressure Generator. However, the basic operation is as follows:

The weight and cylinder assemblies (43A) and (43B) are raised with respect to fixed spherical pistons (41A) and (41B) and then allowed to descend under the action of gravity thereby producing a traceable, reliable reference pressure within the cylinders (42A) and (42B) that is applied to the differential pressure transmitter (1).

The principle of operation is simple. The weight and cylinder assembly (43A) on the high side has the same volume as the weight and cylinder assembly (43B) on the low side. The desired reference differential pressure is developed by a density difference of the weight and cylinder assembly (43A) with respect to the weight and cylinder assembly (43B). The density of the fill fluid changes significantly due to volume changes with respect to pressure or temperature. However, the fill fluid changes produce equal influences upon the assemblies and therefore do not influence the desired reference differential pressure. Thus the reference differential pressure is not influenced by fill fluid density variations that occur with temperature or process pressure.

Innovative concepts have now been provided to enhance the raising and the descent of the weight and cylinder assemblies (43A) and (43B) of FIG. 7. Located within the enclosure are internal magnets (45A) and (45B) that are raised by an opposing magnet field or lowered by an attractive magnetic field. These magnet fields are produced externally.

Positioning an external magnet (48) having an opposing magnetic orientation to the internal magnet (45) produces an opposing magnetic field that raises the internal magnet. Positioning an external magnet (48) having an attractive magnetic orientation to the internal magnet (45) produces an attractive magnetic field that lowers the internal magnet.

The positioning of the external magnets with respect to the internal magnets is simply done by shuttling the external magnets horizontally left or right a distance equal to the one half the horizontal distance between the internal magnets (45A) and (45B). This motion is illustrated in FIG. 7 illustrating the relationship in normal operation desiring to capture the internal magnets by providing an attractive field and reduce vibration of the internal magnets. Fewer magnets could be used but the desired advantage of capturing the internal magnets in normal operation thereby reducing pressure pulsations would not be achieved.

Figure 8:
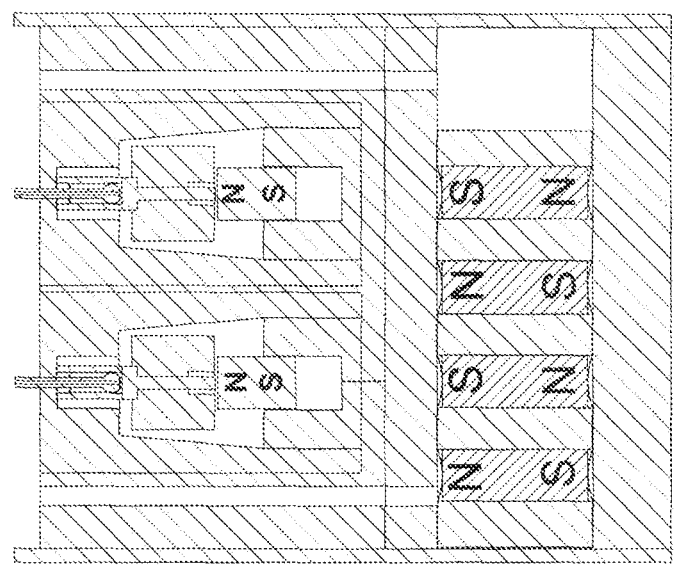
FIG. 8 is a cross sectional view of the gravitational pressure reference with the actuator having raised the weight and cylinder assembly and prepared to initiate development of the gravitational pressure reference.

In the moment prior to the descent of the weight and cylinder assemblies (43A) and (43B) the internal magnets are held in a position illustrated in FIG. 8. To initiate a descent the external magnets (48) are quickly returned to the normal position. At this time the weight assemblies (43A) and (43B) experience a gravitational force that is applied upon the effective area defined by the sphere within the cylinder thereby producing the desired differential pressure.

The positioning of the external magnets is achieved by pneumatic pressure applied to either end of the piston (47) carrying the external magnets (48)

What is claimed is:

1. A differential pressure transmitter, comprising:
    a pair of flexible element assemblies each of which is in fluid communication with a respective port, each of said flexible element assemblies characterized by a ratio of a spring rate to effective area,
    each of said flexible element assemblies comprising:
        one or more convolutions, each of said convolutions comprising at least one axial cylindrical section and at least a radial extension extending from said cylindrical section,
        a flat element end that exhibits a linear deflection in response to a pressure differential applied thereto, and
        an electrode capacitively coupled to said element end for sensing a deflection thereof in response to said applied pressure,
    a connector tube containing a fill fluid for hydraulically coupling said flexible element assemblies, and
    means for determining a differential pressure applied to said ports based on the sensed deflections of said element ends of said pair of flexible element assemblies and for compensating for a difference, if any, between the ratios of spring rate to effective area of said flexible element assemblies.

2. The differential pressure transmitter of claim 1, wherein each of the electrodes of said flexible element assemblies is mounted on an insulator attached to a base.

3. The differential pressure transmitter of claim 2, wherein said base comprises one or more isolation grooves.

4. The differential pressure transmitter of claim 1, wherein each of the electrodes comprises an electrical conductor.

5. The differential pressure transmitter of claim 4, wherein said electrical conductor of each of said electrodes extends to an electrical termination.

6. The differential pressure transmitter of claim 1, wherein each of said flexible element assemblies is disposed within a cavity sealed from the external environment.

7. The differential pressure transmitter of claim 1, wherein said means for determining the differential pressure utilize the ratio of spring rate to effective area of one of the flexible element assemblies as a reference and applies a compensation factor to a signal received from the other flexible element assembly so as to simulate a condition in which said flexible element assemblies exhibit the same ratio of spring rate to effective area.

8. The differential pressure transmitter of claim 7, wherein said flexible element assemblies have equal ratios of spring rate to effective area.

9. The differential pressure transmitter of claim 1, wherein said flexible element assemblies are produced or compensated to exhibit equal ratios of spring rate to effective area.

10. The differential pressure transmitter of claim 1, wherein said means for determining the differential pressure comprises an electronic module external to said body.

11. The differential pressure transmitter of claim 10, wherein said electronic module comprises:
    means for sensing a first capacitance value between the flat element end and the electrode of one of said assemblies and a second capacitance value between the flat element end and the electrode of the other assembly,
    means for determining deflections of the flat element ends of the two assemblies relative to reference positions based on said first and second capacitance values,
    wherein the differential pressure is proportional to a difference of the deflections of the flat element ends.

12. The differential pressure transmitter of claim 1, further comprising a three-position valve, said valve comprising:

a valve body having first and second internal ports each of which is connected to one of said ports that are in communication with said flexible element assemblies, and first and second external ports for coupling to external pressure sources, a rotary valve plug having two internal flow conduits, and means for positioning the rotary valve plug to any of three positions, wherein in a first position the first external port is connected to the first internal port and the second external port is connected to the second internal port, in a second position the first internal port is connected to the second internal port and no connection exists between the first and second external ports, and in a third position the first external port is connected to the second internal port and the second external port is connected to the first internal port.

13. The differential pressure transmitter of claim 1, further comprising a gravitational pressure reference source, said gravitational pressure reference source comprising:

first and second weight and cylinder assemblies disposed in vertical enclosure and configured to move up and down relative to first and second spherical pistons to apply reference pressures to said flexible element assemblies, wherein the weight and cylinder assemblies include weights of equal volumes and different densities, first and second internal magnets disposed in said enclosure below said first and second weight and cylinder assemblies, respectively, three or more magnets external to said enclosure, said external magnets being movable relative to said internal magnets between a first position and a second position, wherein in said first position, two of said external magnets magnetically repulse said first and second internal magnets, respectively, so as to effect raising of said first and second weight and cylinder assemblies, and wherein in said second position, two of said external magnets magnetically attract said first and second internal magnets, respectively, so as to initiate a descent of said first and second weight and cylinder assemblies under influence of gravity and capture said first and second internal magnets on completion of descent.

14. A differential pressure transmitter, comprising:

a pair of flexible element assemblies each of which is in fluid communication with a respective port, each of said flexible element assemblies characterized by a ratio of a spring rate to effective area, a connector tube containing a fill fluid for hydraulically coupling said flexible element assemblies, and an electronic module for determining a differential pressure applied to said ports and for compensating for a difference, if any, between the ratios of spring rate to effective area of said flexible element assemblies.

15. The differential pressure transmitter of claim 14, wherein each of said flexible element assemblies comprises:

a flat element end, and an electrode capacitively coupled to said flat element end for sensing a deflection thereof in response to said differential pressure.

16. The differential pressure transmitter of claim 15, wherein said electronic module senses a change in capacitance between the flat element end and the respective electrode of each of said assemblies.

17. A differential pressure transmitter, comprising:

a body, first and second cavities formed within said body, said first and second cavities being connected, respectively, to first and second ports, first and second flexible element assemblies disposed within said first and second cavities, each of said flexible element assemblies characterized by a ratio of a spring rate to effective area responsive to an applied pressure differential, each of said flexible element assemblies comprising:

one or more convolutions, each of said convolutions comprising at least one axial cylindrical section and at least a radial extension extending from said cylindrical section, a flat element end that exhibits a linear deflection in response to a pressure differential applied thereto, and an electrode capacitively coupled to said flat element end for sensing a deflection thereof in response to said applied pressure, a connector tube containing a fill fluid for hydraulically coupling said flexible element assemblies, and an electronic module external to said body for determining a differential pressure applied to said ports based on the sensed deflections of said element ends of said pair of flexible element assemblies and for compensating for a difference, if any, between the ratios of spring rate to effective area of said flexible element assemblies.

* * * * *